US005565663A

United States Patent [19]

Kossakowski et al.

[11] Patent Number: 5,565,663

[45] Date of Patent: Oct. 15, 1996

[54] ELECTRICAL SWITCH

[75] Inventors: Thomas Kossakowski; Hubert Gerbersmann; Michael Barwanitz, all of Lüdenscheid; Hans-Joachim Frohne, Lehre; Stefan Müller, Helmstedt, all of Germany

[73] Assignee: Leopold Kostal GmbH & Co. KG, Ludenscheid, Germany

[21] Appl. No.: 401,712

[22] Filed: Mar. 10, 1995

[30] Foreign Application Priority Data

Mar. 18, 1994 [DE] Germany .......................... 44 09 460.4

[51] Int. Cl.[6] .............................. H01H 3/32; H01H 9/20; H02B 1/044

[52] U.S. Cl. ...................................... 200/17 R; 200/50.19

[58] Field of Search .................................. 200/4, 17, 18, 200/16 C, 50 A, 329, 295, 297, 50.01–50.2; 335/20

[56] References Cited

U.S. PATENT DOCUMENTS

| | | | |
|---|---|---|---|
| 2,866,864 | 12/1958 | Giessner et al. | 200/50.19 |
| 3,197,598 | 7/1965 | Andersen et al. | 200/314 |
| 4,048,599 | 9/1977 | Groth | 335/20 |
| 4,797,520 | 1/1989 | Spazierer et al. | 200/4 X |
| 5,012,056 | 4/1991 | Abel et al. | 200/329 X |

FOREIGN PATENT DOCUMENTS

| | | | |
|---|---|---|---|
| 6939583 | 11/1969 | Germany | H02B 1/04 |
| 2816450 | 1/1985 | Germany | H02B 1/04 |
| 3533056 | 3/1987 | Germany | H01H 9/18 |

*Primary Examiner*—J. R. Scott
*Attorney, Agent, or Firm*—Brooks & Kushman PC

[57] ABSTRACT

An electrical switch comprises a housing provided with at least one fixed contact part and one switching contact part, which moves in cooperation therewith. At least one actuating element is movably mounted in the housing. The actuating element influences switching positions of the switching contact part. Also disclosed is a camform which defines the switching positions and which interacts with a spring-loaded plunger associated with the actuating element in order to create operating forces. Moreover, a displaceable spring-loaded retaining device is disposed within the housing which enables the electrical switch to be held firmly in a locked position. Finally, at least one actuating element cooperates with a retaining device through a transfer device so that by use of increased force, the actuating element is brought into a functional position which does not correspond with any of the switching positions. The retaining device is brought into its unlocked position when the actuating element is in its functional position.

18 Claims, 4 Drawing Sheets

ELECTRICAL SWITCH

TECHNICAL FIELD

The present invention is based on an electrical switch designed to interrupt or close one or more electrical circuits by moving switch contact parts. In order to make handling easier, such electrical switches are retained in a predetermined position within a defined mounting area. However, it is often necessary to release the switch for various purposes.

BACKGROUND ART

Many different types of prior art electrical switches include electrical switches with housings generally having a fixed contact part and a switching contact part. Typically, at least one actuating element is movably mounted in the housing. In order to release these switches from a predetermined position, it is often necessary to remove a specific part of the switch or to use a suitable tool. One disadvantage of this, however, is that considerable time and effort must be expended in order to release the switch and it may also be that a suitable tool is not available.

SUMMARY OF THE INVENTION

An aim of the present invention is to create a switch which can be removed simply and without undue effort, without the use of a special tool or the removal of a component being necessary.

Accordingly, an electrical switch is disclosed which comprises a housing provided with at least one fixed contact part and one switching contact part which moves in cooperation therewith. At least one actuating element is movably mounted in the housing, the actuating element influencing switching positions of the switching contact part.

A cam form is provided which defines the switching positions. It interacts with a spring-loaded plunger associated with the actuating element in order to create operating forces.

A displaceable spring-loaded retaining device is disposed within the housing. It enables the electrical switch to be held firmly in a locked position.

Also provided is at least one actuating element cooperating through a transfer device. By use of increased force, the actuating element is brought into a functional position which does not correspond with any of the switching positions. The retaining device may be brought into its unlocked position when the actuating element is in its functional position.

An advantage of the disclosed switch is that the danger of damage, or unwanted marking of the switch or the surrounding region during switch release, is effectively eliminated.

The invention is shown in more detail in the drawings and described with reference to examples.

BRIEF DESCRIPTION OF THE DRAWINGS

The parts of the switch which are not relevant to the invention have been omitted from the drawings for the sake of simplicity. Parts similar to one another have been given the same numbers.

BEST MODES FOR CARRYING OUT THE INVENTION

Figure 3:
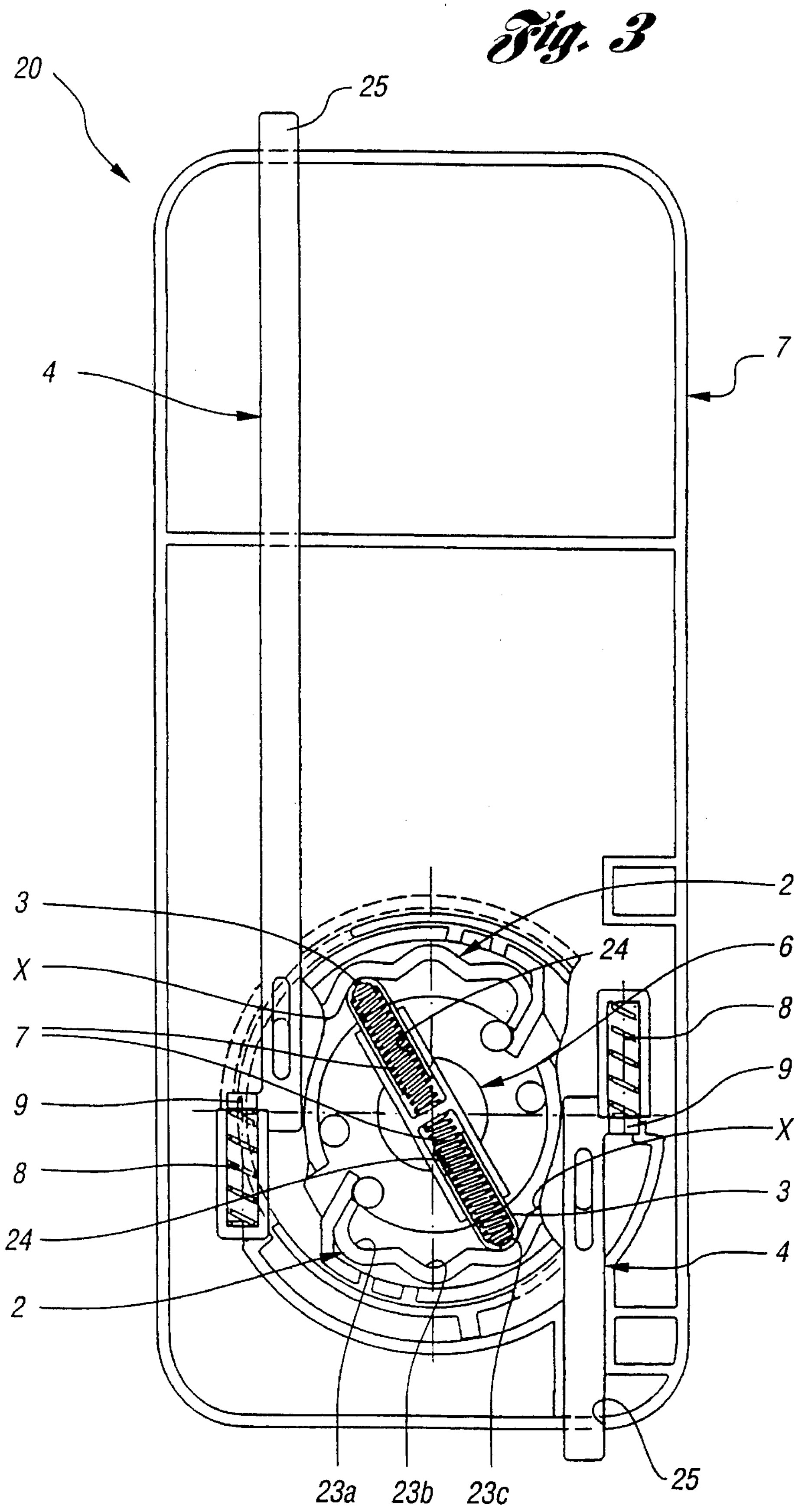
FIG. 3 is a partial cross-sectional view of the electrical switch shown from below, with the retaining device in a locked position within a housing.
Figure 4:
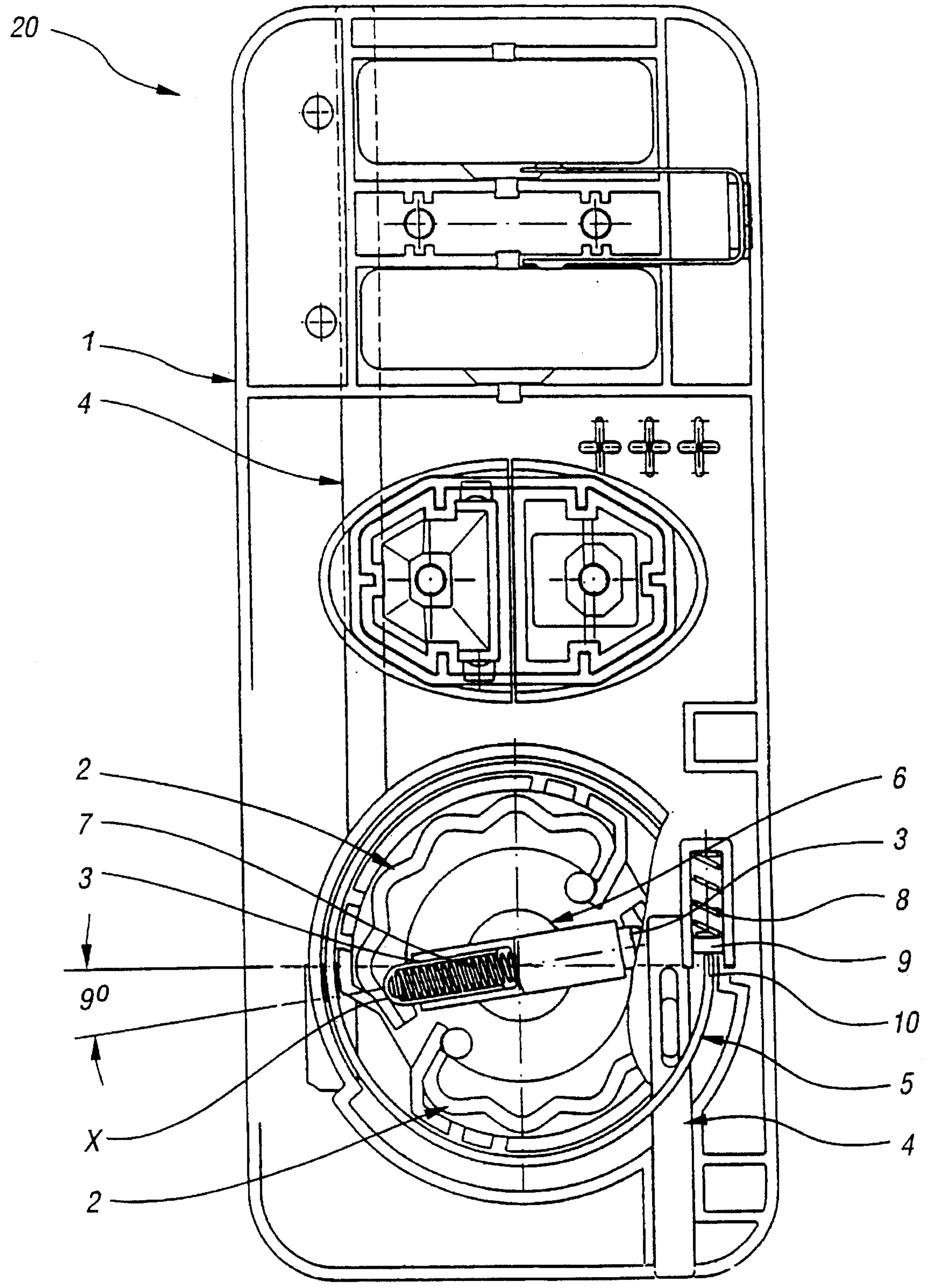
FIG. 4 is a partial cross-sectional view of the electrical switch shown from below, with the retaining device in a release position.

An electrical switch 20, best seen in FIGS. 3 and 4 consists primarily of a housing 1, which accommodates fixed and movable contact parts, and an actuating element 21 which is mounted so as to be movable in relation to the housing 1 and which influences a retaining device. In order that defined switching positions may be achieved, the actuating element 21 interacts with two camforms 2 by means of spring-loaded plungers 3. The camforms 2 are firmly fixed within housing 1, one spring-loaded plunger 3 being allocated to each. In addition, the housing 1 is provided with a retaining device 22 which consists of two retaining elements 4, which may be moved in a defined fashion to retain electrical switch 20 within housing 1 (FIG. 3). Also, retaining elements 4 may be actuated by actuating element 21 to disengage retaining elements 4 from housing 1 (FIG. 4).

Figure 1:
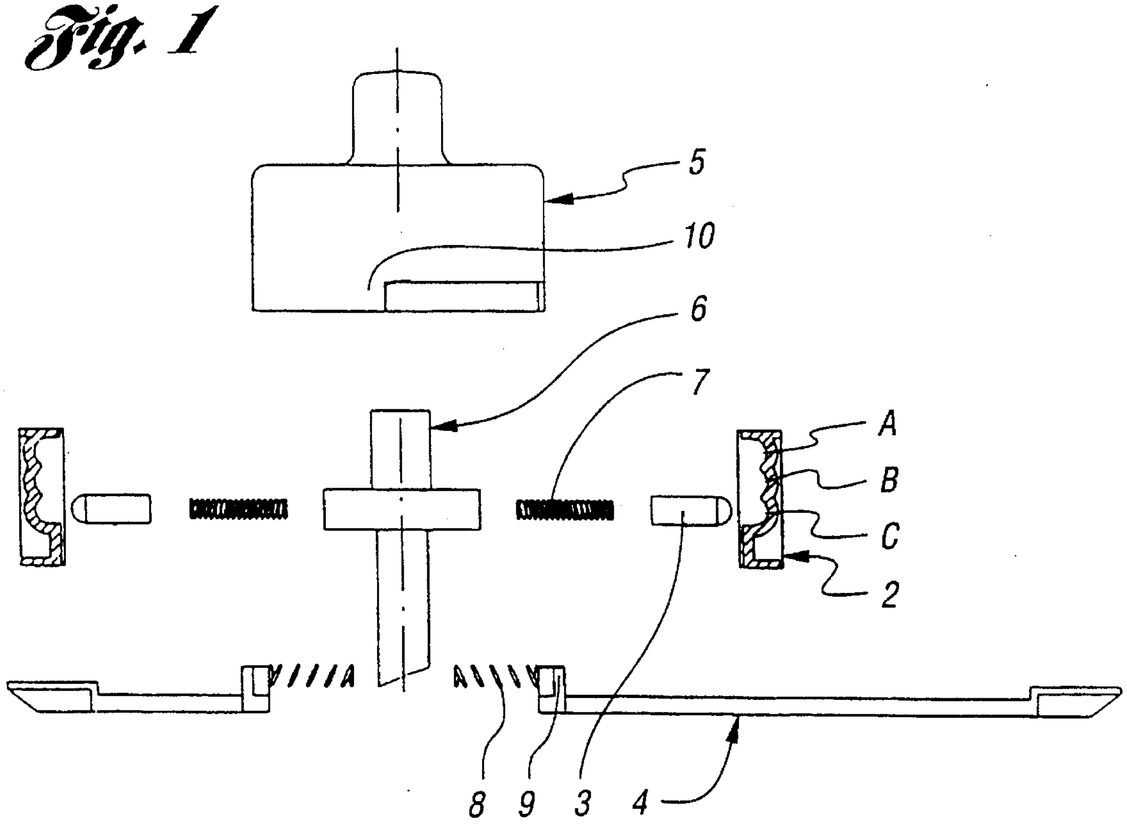
FIG. 1 is an exploded view of a first embodiment of a retaining device for an electrical switch.
Figure 5:
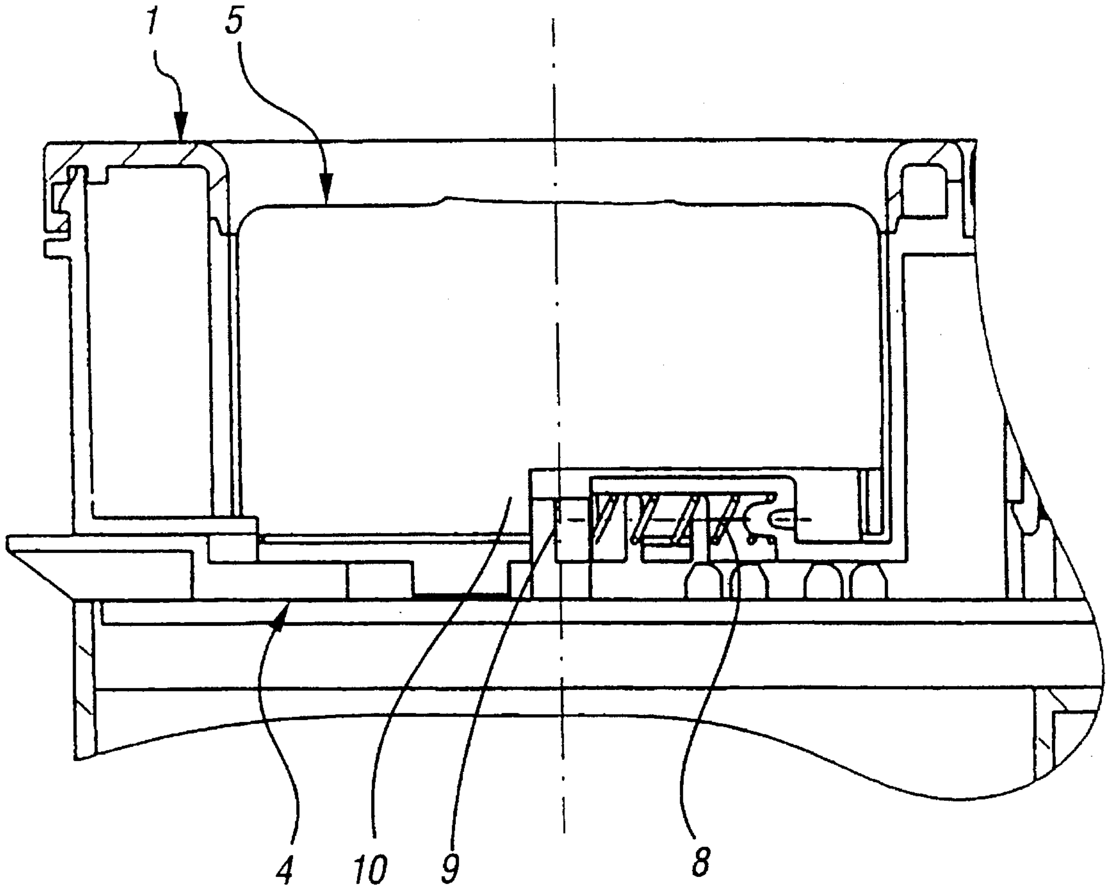
FIG. 5 is another cross-sectional view of the electrical switch.

As can particularly be seen from FIGS. 1 and 5, the actuating element 21 for the retaining device is in the form of operating knob 5, which may pushed, pulled, or rotated.

Operating knob 5 cooperates with the housing 1 by means of rotatable shaft 6. Initially, operating knob 5 can be moved between three different switching positions in a first switching plane C by means of simple rotation. Push and pull actuation additionally allows movement between three switching planes—C, already mentioned, and further switching planes B and A. Each switching plane exhibits several switching positions which may be reached by rotation of the knob. In order to create the necessary operating forces, the two plungers 3 each interact with recesses **23*a,b,c* in the relevant camform 2 (FIG. 3) and are spring-loaded. For the accommodation of the two plunger springs, two retaining chambers 24 are present in rotatable shaft 6 which are at an angle of 180 degrees to each other so that the two plungers 3 are held against the spring force of plunger springs 7 in a movable fashion. The shape of the camform tracks which interact with the plungers 3 means that operating knob 5 is held in its various switching positions within the switching planes A,B,C in a defined fashion. In addition, each camform 2 defines an area X which gives rise to increased forces which must be overcome if the retaining device 22 is to be brought into the unlocked position by actuation of operating knob 5**.

Area X is formed in such a way that the user notices a marked increase in operating force when the operating knob is brought into such a position that area X comes into play. The increase in force is such that a conscious effort is necessary on the part of the user if operating knob 5 is to actuate the unlocking of retaining device 22 from housing 1. For this actuation to take place, operating knob 5 must first be brought into the lowest switching plane C and then turned around its rotatable shaft 6. The direction of rotation is opposite to that which is needed to bring the knob into any of the switching positions in switching plane C. Only when operating knob 5 has been brought into the unlocking function position (FIG. 4) by means of the prescribed sequence of movements and the increased resistance has been overcome are the retaining elements 4 of the retaining device in the unlocked position disengaged from housing 1. This means also, that only when operating knob 5 is held in the unlocking position against the existing forces, can the electrical switch 20 be easily removed from its outer housing. When the operating knob 5 is released, retaining elements 4 of the retaining device return automatically to the locked position (FIG. 3).

Both retaining elements 4 are in the form of sliders and held movably in the housing against the force of two helical compression springs 8 which are allocated to them. This slider design of retaining elements 4 means that the electrical switch is held securely in its position within the housing 1 when the retaining device 22 is in the locked position. The electrical switch 20 cannot be released from the housing 1 by means of a simple pulling movement because retaining elements 4 engage with equivalent retaining edges or apertures 25 in the housing 1. An actuator tab 9 is formed onto each retaining element 4, which cooperates with the transfer device to displace retaining elements 4. Preferably, the retaining elements 4 are made of plastic.

The transfer device is molded in one piece onto the underside of operating knob 5 as follows. The pot-shaped underside of operating knob 5 is formed in such a way as to provide two extensions 10 in the direction of retaining elements 4. In order to operate retaining elements 4, the edge of each extension 10 comes to rest against the actuator tab 9 of the relevant retaining element 4. When the operating knob 5 is brought into the position necessary to actuate the release device 22, the edges of extensions 10 press retaining elements 4 back into the housing 1 against the force of helical springs 8. In this way, retaining elements 4 clear the way for the removal of the electrical switch 20 from its predetermined mounting area.

Figure 2:
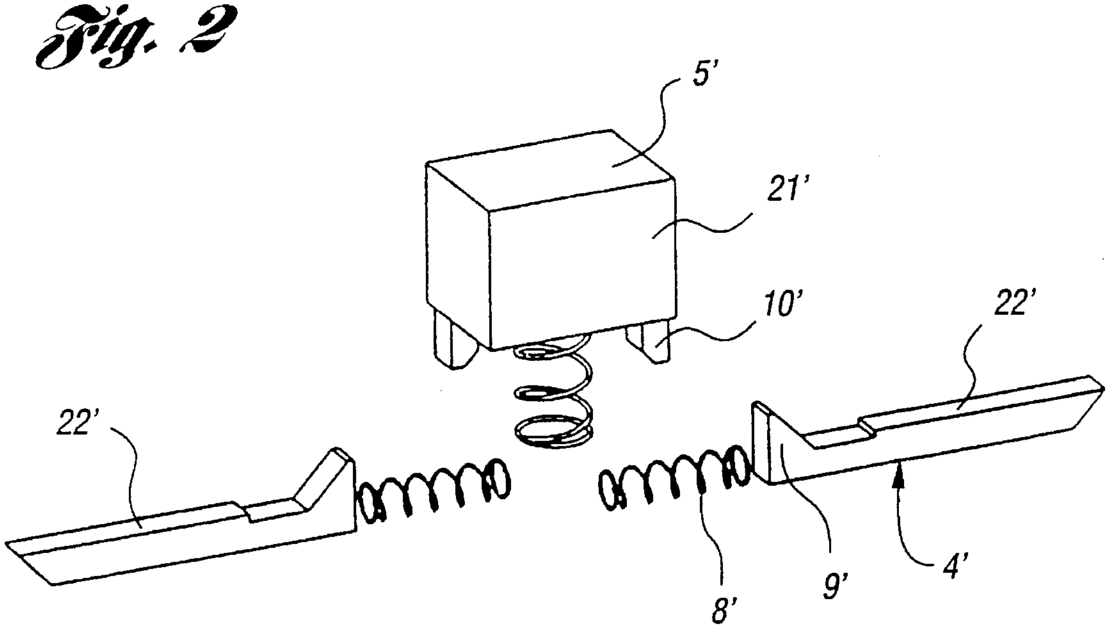
FIG. 2 is a quartering perspective view of a second embodiment of a retaining device.

As can particularly be seen from FIG. 2, it is also possible for a retaining device 22' to be unlocked by means of pushing motion.

In order to achieve this, extensions 10' are provided with actuation surfaces which run in a direction which is angularly inclined relative to the displacement direction of the transfer device. These come to rest against flanks which are formed onto actuation tabs 9' of retaining elements 4' and which run in a direction which is angularly inclined to the displacement angle of the retaining elements 4. By means of a pushing movement of the transfer device, the inclined actuation surfaces and the inclined flanks glide onto one another and pull retaining elements 4' backwards into 1 housing 1 against the force of helical compression springs 8'. In this way, again, retaining elements 4' clear the way for the removal of the electrical switch from its predetermined mounting area.

While the best modes for carrying out the invention have been described in detail, those familiar with the art to which this invention relates will recognize various alternative designs and embodiments for practicing the invention as defined by the following claims.

What is claimed is:

1. An electrical switch comprising:

a housing for supporting at least one fixed contact part;

at least one actuating element movably mounted relative to the housing to move between switching positions and which may support a switching contact part;

a camform affixed to one of the housing or the at least one actuating element and which has recesses therein which define the switching positions;

a spring-loaded plunger which interacts with the recesses of the camform and the other of the housing or the at least one actuating element in order to create operating forces which hold the actuating element in one of the discrete switching positions; and a displaceable spring-loaded retaining device disposed within the housing which cooperates with the at least one actuating element to releasably hold the actuating element within the housing, the displaceable spring-loaded retaining device being selectively positionable between locked and unlocked positions relative to the housing wherein in the locked position the at least one actuating element is retained within the housing and in the unlocked position the at least one actuating element may be removed from the housing.

2. The electrical switch of claim 1 wherein:

the at least one actuating element cooperates with the retaining device so that when the at least one actuating element is brought into a functional position which does not correspond with any of the switching positions, the retaining device is brought into its unlocked position wherein the at least one actuating element may be removed from the housing.

3. An electrical switch according to claim 2, wherein the camform has axially spaced recesses and the functional position of the at least one actuating element is axially spaced from at least one of the switching positions.

4. An electrical switch according to claim 2, wherein the camform has circumferentially spaced recesses and the functional position of the at least one actuating element is circumferentially spaced from the functional position.

5. An electrical switch according to claim 2, wherein the functional position of the actuating element is reached by a movement which is in a different direction from that which is necessary to reach the switching position(s).

6. An electrical switch according to claim 2, wherein the functional position of the actuating element is reached by combining various directions of movement.

7. An electrical switch according to claim 2, wherein a greater force is created by interaction occurring between the camform (2) and the plunger (3) when the at least one actuating element is in the functional position than in the switch positions.

8. An electrical switch according to claim 2, wherein the retaining device includes at least one retaining element (4) which is mounted movably in the housing (1) and which is brought into its locked position by means of the force exerted by a spring (8).

9. An electrical switch according to claim 2, wherein a transfer device is formed in one piece onto the underside of the at least one actuating element, the underside facing towards the retaining device.

10. An electrical switch according to claim 9, wherein the transfer device includes at least one extension (10) which is formed onto the underside of the actuating element, an edge of the extension cooperating with an actuation tab (9) which is formed onto the retaining element (4).

11. An electrical switch according to claim 10, wherein the extension provided in the transfer device is provided with an actuation surface that runs in a direction which is angularly inclined to the direction of movement of the transfer device.

12. An electrical switch according to claim 11, wherein the actuation tab (9) which is formed onto retaining element (4) is provided with a flank which cooperates with the angularly inclined actuation surface of the transfer device and which runs in a direction which is angularly inclined to the direction of movement of the retaining element (4).

13. An electrical switch according to claim 12, wherein the retaining device includes two retaining elements (4) which are mounted in the housing in a movable fashion.

14. An electrical switch according to claim 13, wherein the actuating element comprises a combination switching knob (5) which implements rotary, push and pull movements, the pot-shaped underside of the knob which faces the retaining device being provided with two extensions (10) which form the transfer device, the leading edge of each extension (10) cooperating with an actuation tab (9) on each of the two retaining elements (4) which are movably mounted in housing (1), the rotary shaft (6) of the combination switching knob (5) being provided with two retaining chambers, each accommodating a spring-loaded plunger (3) that interacts with the camform (2) which is firmly fixed in housing (1).

15. An electrical switch according to claim 14, wherein the functional position of the actuating element is reached by means of a combined rotary and pushing movement.

16. An electrical switch comprising:

a housing for supporting at least one fixed contact part at least one actuating element movably mounted in the housing to move between discrete switching positions relative to the housing and which may support a switching contact part in cooperation with the at least one fixed contact part;

a camform affixed to one of the housing or the at least one actuating element and which defines the switching positions;

a spring-loaded plunger which interacts with the camform and the other of the housing or the at least one actuating element in order to create operating forces which hold the actuating element in one of the discrete switching positions; and a displaceable spring-loaded retaining device disposed within the housing which enables the at least one actuating element to be held within the housing;

the at least one actuating element cooperating with the retaining device so that the at least one actuating element is brought into a functional position which does not correspond with any of the switching positions, the retaining device being brought into its unlocked position when the actuating element is in the functional position so that the at least one actuating element may be removed from the housing.

17. An electrical switch according to claim 16 wherein at least one actuating element is in the form of a rotary knob.

18. An electrical switch according to claim 16 wherein at least one actuating element is in the form of a push-button member.

* * * * *